US011978328B2

(12) United States Patent
Kolavennu et al.

(10) Patent No.: US 11,978,328 B2
(45) Date of Patent: May 7, 2024

(54) SYSTEMS AND METHODS FOR IDENTIFYING USER-CUSTOMIZED RELEVANT INDIVIDUALS IN AN AMBIENT IMAGE AT A DOORBELL DEVICE

(71) Applicant: Ademco Inc., Golden Valley, MN (US)

(72) Inventors: Soumitri Kolavennu, Blaine, MN (US); Nathaniel Kraft, Minnetonka, MN (US)

(73) Assignee: ADEMCO INC., Golden Valley, MN (US)

( * ) Notice: Subject to any disclaimer, the term of this patent is extended or adjusted under 35 U.S.C. 154(b) by 204 days.

(21) Appl. No.: 16/860,157

(22) Filed: Apr. 28, 2020

(65) Prior Publication Data
US 2021/0335109 A1  Oct. 28, 2021

(51) Int. Cl.
*H04N 23/61*  (2023.01)
*G06F 16/51*  (2019.01)
(Continued)

(52) U.S. Cl.
CPC ......... *G08B 13/1968* (2013.01); *G06F 16/51* (2019.01); *G06F 16/535* (2019.01); *G06F 16/56* (2019.01); *G06F 16/5854* (2019.01); *G06F 16/587* (2019.01); *G06N 5/04* (2013.01); *G06N 20/00* (2019.01); *G06Q 50/265* (2013.01);
(Continued)

(58) Field of Classification Search
USPC ....................................................... 348/152
See application file for complete search history.

(56) References Cited

U.S. PATENT DOCUMENTS

| 7,634,662 | B2 | 12/2009 | Monroe |
| 10,140,718 | B2 | 11/2018 | Chen et al. |
| 10,475,311 | B2 | 11/2019 | Simonoff |
| 10,489,887 | B2 | 11/2019 | El-Khamy et al. |
| 10,726,274 | B1* | 7/2020 | Hasegawa ............ G06V 40/172 |

(Continued)

FOREIGN PATENT DOCUMENTS

| CN | 108921001 A | 11/2018 |
| CN | 110414305 A | 11/2019 |
| WO | 2019202587 A1 | 10/2019 |

OTHER PUBLICATIONS

Paul, et al., EURASIP Journal on Advances in Signal Processing, Human detection in surveillance videos and its applications a review, 2013, http://asp.eurasipjournals.com/content/2013/1/176, 16 pgs.

(Continued)

*Primary Examiner* — Nigar Chowdhury
(74) *Attorney, Agent, or Firm* — Fredrikson & Byron, P.A.

(57) ABSTRACT

Systems and methods for identifying user-customized relevant individuals in an ambient image at a doorbell device are provided. Such systems and methods can include receiving user input that includes image information, using the image information to compile a custom image database containing a plurality of images that depict such relevant individuals, and storing the custom image database in local memory of the doorbell device. Then, such systems and methods can include capturing an ambient image with a camera of the doorbell device, determining whether any person depicted in the ambient image matches any of the relevant individuals by comparing the ambient image to the plurality of images at the doorbell device, and generating an alert when any person depicted in the ambient image matches any of the relevant individuals.

20 Claims, 2 Drawing Sheets

(51) Int. Cl.

| | |
|---|---|
| *G06F 16/535* | (2019.01) |
| *G06F 16/56* | (2019.01) |
| *G06F 16/583* | (2019.01) |
| *G06F 16/587* | (2019.01) |
| *G06N 5/04* | (2023.01) |
| *G06N 20/00* | (2019.01) |
| *G06Q 50/26* | (2012.01) |
| *G06V 40/16* | (2022.01) |
| *G06V 40/50* | (2022.01) |
| *G08B 13/196* | (2006.01) |
| *G08B 13/19* | (2006.01) |

(52) U.S. Cl.
CPC .......... *G06V 40/172* (2022.01); *G06V 40/50* (2022.01); *H04N 23/61* (2023.01)

(56) References Cited

U.S. PATENT DOCUMENTS

| | | | | |
|---|---|---|---|---|
| 10,861,265 | B1* | 12/2020 | Merkley | G06V 10/751 |
| 11,304,123 | B1* | 4/2022 | Noonan | H04W 48/16 |
| 2003/0018531 | A1* | 1/2003 | Mahaffy | G06Q 20/20 |
| | | | | 705/16 |
| 2004/0005086 | A1* | 1/2004 | Wolff | G06V 40/161 |
| | | | | 382/284 |
| 2006/0212341 | A1* | 9/2006 | Powers | G06Q 30/02 |
| | | | | 705/7.29 |
| 2009/0002157 | A1* | 1/2009 | Donovan | H04N 7/18 |
| | | | | 340/540 |
| 2009/0176544 | A1* | 7/2009 | Mertens | A63F 13/52 |
| | | | | 463/5 |
| 2009/0181640 | A1* | 7/2009 | Jones | G08B 25/08 |
| | | | | 455/404.2 |
| 2009/0208052 | A1* | 8/2009 | Kaplan | G06F 3/011 |
| | | | | 382/103 |
| 2009/0222388 | A1 | 9/2009 | Hua et al. | |
| 2009/0319361 | A1* | 12/2009 | Conrady | G06Q 20/10 |
| | | | | 709/204 |
| 2014/0032538 | A1* | 1/2014 | Arngren | G06F 16/41 |
| | | | | 707/723 |
| 2015/0363500 | A1* | 12/2015 | Bhamidipati | G06F 3/04842 |
| | | | | 707/722 |
| 2016/0065861 | A1 | 3/2016 | Steinberg et al. | |
| 2016/0132720 | A1* | 5/2016 | Klare | G06V 10/42 |
| | | | | 382/118 |
| 2016/0196467 | A1* | 7/2016 | Xia | G06V 40/165 |
| | | | | 382/118 |
| 2017/0083790 | A1 | 3/2017 | Risinger et al. | |
| 2017/0085844 | A1 | 3/2017 | Scalisi et al. | |
| 2017/0092109 | A1* | 3/2017 | Trundle | G08B 25/006 |
| 2018/0059660 | A1* | 3/2018 | Heatzig | B64C 39/024 |
| 2018/0121571 | A1* | 5/2018 | Tiwari | G06F 30/13 |
| 2018/0268674 | A1* | 9/2018 | Siminoff | H04N 7/186 |
| 2018/0285648 | A1 | 10/2018 | Pan et al. | |
| 2018/0307903 | A1 | 10/2018 | Siminoff | |
| 2019/0035242 | A1 | 1/2019 | Vazirani | |
| 2019/0130278 | A1 | 5/2019 | Karras et al. | |
| 2019/0130583 | A1 | 5/2019 | Chen et al. | |
| 2019/0188980 | A1* | 6/2019 | Viswanathan | G08B 13/19684 |
| 2019/0197848 | A1* | 6/2019 | Bradley | G08B 29/185 |
| 2019/0373186 | A1* | 12/2019 | Ortiz Egea | H04N 5/332 |
| 2020/0019921 | A1 | 1/2020 | Buibas et al. | |
| 2020/0020221 | A1 | 1/2020 | Cutler et al. | |
| 2020/0135182 | A1* | 4/2020 | Kahlon | G10L 15/22 |
| 2020/0242336 | A1* | 7/2020 | Boic | G06V 40/161 |
| 2020/0301936 | A1* | 9/2020 | Miller | G06F 11/3072 |
| 2020/0394804 | A1 | 12/2020 | Barton et al. | |
| 2021/0152880 | A1* | 5/2021 | Marten | H04N 21/4542 |
| 2021/0209349 | A1 | 7/2021 | Mehl et al. | |

OTHER PUBLICATIONS

Lai Wei-Sheng et al "Deep Laplacian Pyramid Networks for Fast and Accurate Super-Resolution" , 2017 IEEE Conference on Computer Vision and Pattern Recognition, IEEE Computer Society, US, Jul. 21, 2017, 9 pgs.

Xu Jia et al "Super-Resolution with Deep Adaptive Image Resampling" , arxiv.org, Cornell University Library, Ithaca, NY 14853, Dec. 18, 2017, 10 pgs.

Europe IBM Intelligent Video Analytics V3.0, 5725-H94 IBM Intelligent Video Analytics V3.0, IBM Europe Sales Manual, Revised Apr. 23, 2019, https://www-01.ibm.com/common/ssi/ShowDoc.wss?docURL=/common/ssi/rep_sm/4/877/ENUS5725-H94/index.html&lang=en&request_locale=en, 15 pgs.

"Taking Motion Analytics to a New Level With AI, AI Motion Analytics Software Solutions" Artificial Intelligence, Jan. 9, 2020, https://www.osplabs.com/ai-motion-analytics/, 4 pgs.

International Search Report and Written Opinion of the International Application No. PCT/US2021/029380, dated Jul. 16, 2021, 14 pg.

Rechelle Ann Fuertes, Max Planck Institute for Intelligent Systems, New EnhanceNet-PAT AI Turns Low-Resolution Images into High-Res., https://edgy.app/new-ai-system-to-turn-low-resolution-images-to-high-resolution, Oct. 30, 2017, 4 pgs.

Christopher Thomas, BSc Hons., MIAP, Deep learning based super resolution, without using a GAN, Feb. 24, 2019 https://towardsdatascience.com/deep-learning-based-super-resolution-without-using-gan- . . . , 50 pgs.

Sajjad et al., Max Planck Institute for Intelligent Systems, EnhanceNet: Single Image Super-Resolution Through Automated Texture Synthesis, Jan. 27, 2020, 19 pgs.

Zhao, Liang, et al., "Stereo- and Neural Network-Based Pedestrian Detection," Sep. 2000, IEEE Transactions on Intelligent Transportation Systems ( vol. 1, Issue: 3, Sep. 2000), pp. 148-152.

Chan, Chee Seng, et al., "A Fuzzy Qualitative Approach to Human Motion Recognition," Sep. 23, 2008, 2008 IEEE International Conference on Fuzzy Systems (IEEE World Congress on Computational Intelligence), pp. 1242-1247.

Yan, Zhennan, et al., "Multi-Instance Deep Learning: Discover Discriminative Local Anatomies for Bodypart Recognition," Feb. 3, 2016, IEEE Transactions on Medical Imaging, vol. 35, No. 5, May 2016, pp. 1333-1340.

Nadeem, Amir, et al., Automatic human posture estimation for sport activity recognition with robust body parts detection and entropy markov model, Mar. 16, 2021, Multimedia Tools and Applications (2021) 80:21465-21498, pp. 21466-21480.

Jalal, Ahmed, et al., "A Depth Video-based Human Detection and Activity Recognition using Multi-features and Embedded Hidden Markov Models for Health Care Monitoring Systems," Jan. 2017, International Journal of Interactive Multimedia and Artificial Intelligence ,vol. 4, N°4,https://www.researchgate.net/publication/312483, 10 pgs.

Yang, Yuxiang, et al. "Depth map super-resolution using stereo-vision-assisted model." Neurocomputing 149 (2015): 1396-1406.

Wang, Yifan, et al. "Resolution-aware network for image super-resolution." IEEE Transactions on Circuits and Systems for Video Technology 29.5 (2018): 1259-1269.

Yang, Wenming, et al. "LCSCNet: Linear compressing-based skip-connecting network for image super-resolution." IEEE Transactions on Image Processing 29 (2019): 1450-1464.

Wei, Wei, et al. "Unsupervised recurrent hyperspectral imagery super-resolution using pixel-aware refinement." IEEE Transactions on Geoscience and Remote Sensing 60 (2020): 1-15.

How-Lung Eng, "Dews: A Live Visual Surveillance System for Early Drowning Detection at Pool," Feb. 8, 2007, IEEE Transactions on Circuits and Systems for Video Technology, vol. 18, No. 2, Feb. 2008, pp. 197-208.

Tingzhuang Liu, "A video drowning detection device based on underwater computer vision," Feb. 5, 2023,The Institution of Engineering and Technology, DOI: 10.1049/ipr2.12765, pp. 1910-1916.

English language translation of bibliographic data and abstract of CN110414305 (A).

* cited by examiner ated on.
However, such known systems remotely process the ambient image on the remote cloud server and compare the ambient image to a large, unrestricted universe of databases in an attempt to find a match for any person depicted in the ambient image. Accordingly, known systems consume a large amount of time and processing power to process the ambient image.

SYSTEMS AND METHODS FOR IDENTIFYING USER-CUSTOMIZED RELEVANT INDIVIDUALS IN AN AMBIENT IMAGE AT A DOORBELL DEVICE

FIELD

The present invention relates generally to doorbell devices. More particularly, the present invention relates to systems and methods for identifying user-customized relevant individuals in an ambient image at a doorbell device.

BACKGROUND

A known doorbell device can capture an ambient image and receive signals from a remote cloud server that indicate whether any person depicted in the ambient image is a threat to a region outside of which the doorbell device is located. However, such known systems remotely process the ambient image on the remote cloud server and compare the ambient image to a large, unrestricted universe of databases in an attempt to find a match for any person depicted in the ambient image. Accordingly, known systems consume a large amount of time and processing power to process the ambient image.

In view of the above, there is a need and an opportunity for improved systems and methods.

DETAILED DESCRIPTION

Figure 1:
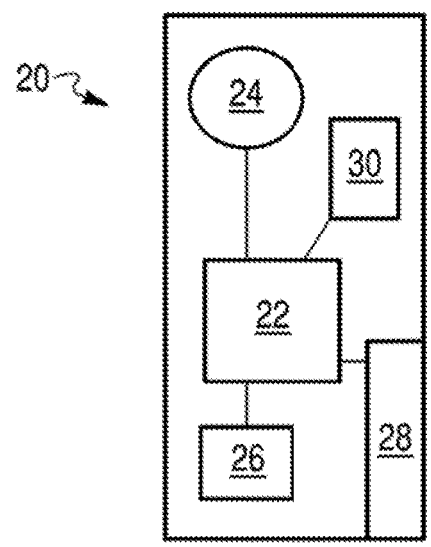
FIG. 1 is a block diagram of a doorbell device in accordance with disclosed embodiments.

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments of the claimed invention can include systems and methods for identifying user-customized relevant individuals in an ambient image at a doorbell device. In some embodiments, the doorbell device can include a processor, a local memory, and a camera, and in some embodiments, the processor can receive user input that includes image information, compile a custom image database using the image information, and store the custom image database in the local memory. In some embodiments, the custom image database can contain a plurality of images that can depict such relevant individuals, and in some embodiments, a number of the relevant individuals can be less than or equal to a predetermined maximum. For example, in some embodiments, the predetermined maximum can be proportional to a processing power of the processor.

In some embodiments, after the local memory stores the custom image database therein, the camera can capture an ambient image, and the processor can determine whether any person depicted in the ambient image matches any of the relevant individuals by comparing the ambient image to the plurality of images. When any person depicted in the ambient image matches any of the relevant individuals, the processor can generate an alert. In some embodiments, determining whether any person depicted in the ambient image matches any of the relevant individuals can include determining whether a first number of extracted features of a first person depicted in the ambient image match a predetermined number of extracted features of any of the relevant individuals.

For example, in some embodiments, the extracted features can include human characteristics, such as eye color, hair color, face size, face shape, and any other human characteristic as would be known to one of ordinary skill in the art. Furthermore, in some embodiments, a particular one of the extracted features may be given more weight than other ones of the extracted features in determining whether there is a match.

Additionally or alternatively, in some embodiments, the extracted features can include facial recognition characteristics. In these embodiments, the processor can vector map the plurality of images with an artificial intelligence model to identify respective facial recognition characteristics of each of the relevant individuals and store results of such vector mapping in the local memory as part of the custom image database for later use. Similarly, after the ambient image is captured, the processor can vector map the ambient image with the artificial intelligence model to identify personal facial characteristics of any person depicted in the ambient image. Then, the processor can determine that any person depicted in the ambient image matches any of the relevant individuals when the personal facial recognition characteristics of any person depicted in the ambient image match the respective facial recognition characteristics of any of the relevant individuals.

As explained above, the processor can compile and store the custom image database in the local memory of the doorbell device before the camera captures the ambient image and the processor determines whether any person depicted in the ambient image matches any of the relevant individuals. Advantageously, storing the custom image database in the local memory of the doorbell device prior to the camera capturing the ambient image and the processor determining whether any person depicted in the ambient image matches any of the relevant individuals enables the doorbell device to identify a presence of any of the relevant individuals locally and without communicating with a cloud server or any other external databases that are remote from the doorbell device, thereby (1) enabling a quicker identification of the presence of any of the relevant individuals when compared to systems and methods that communicate with the cloud server and the external databases after the camera captures the ambient image, (2) reducing latency that would otherwise be caused by communicating with the cloud server and the external databases after the camera captures the ambient image, and (3) providing enhanced security to a user, for example, by preventing the relevant individuals from evading identification by severing a connection between the doorbell device and the cloud server.

As explained above, the processor can receive the user input that includes the image information for use in compiling the custom image database. In some embodiments, the doorbell device can include a transceiver that can receive the user input from a user device via a network. Additionally or alternatively, in some embodiments, the doorbell device can include a local user interface, such as a keypad or a touch screen that can receive the user input.

In some embodiments, the image information can include threat criteria, a geographic location, and a location range, and in these embodiments, the processor can parse the threat criteria to identify relevant image databases to query and retrieve the plurality of images from the relevant image databases. Accordingly, in these embodiments, each of the plurality of images can depict a respective registered individual who is associated with (1) a respective criminal history that matches the threat criteria and (2) a respective residence that falls within the location range of the geographic location, and the relevant individuals can include the respective registered individual depicted in each of the plurality of images.

Additionally or alternatively, in some embodiments, the image information can include a plurality of grey-list images, each of which can depict a respective user-identified individual. In these embodiments, the processor can compile the plurality of grey-list images into the custom image database, and the relevant individuals can include the respective user-identified individual depicted in each of the plurality of grey-list images. In some embodiments, the respective user-identified individual depicted in any of the plurality of grey-list images can include a known safe person, such as a family member of the user, a babysitter employed by the user, a housekeeper employed by the user, and/or a friend of the user. Additionally or alternatively, in some embodiments, the respective user-identified individual depicted in any of the plurality of grey-list images can include a known un-safe person, such as an ex-spouse of the user, an ex-partner of the user, and/or a stalker of the user. In some embodiments, the processor can generate a first of a plurality of alerts when the processor determines that any person depicted in the ambient image matches the known safe person and generate a second of a plurality of alerts when the processor determines that any person depicted in the ambient image matches the known un-safe person.

In some embodiments, the processor can compile the custom image database at the doorbell device. Additionally or alternatively, in some embodiments, the processor can compile the custom image database by receiving the custom image database from the cloud server, and in these embodiments, the cloud server can execute some steps that would be otherwise executed by the processor as described above. For example, in some embodiments, the cloud server can parse the threat criteria to identify the relevant image databases to query and retrieve the plurality of images from the relevant image databases. Additionally or alternatively, in some embodiments, the cloud server can compile the plurality of grey-list images into the custom image database. Additionally or alternatively, in some embodiments, the cloud server can vector map the plurality of images with the artificial intelligence model to identify the respective facial recognition characteristics of each of the relevant individuals. Additionally or alternatively, in some embodiments, the cloud server can receive the user input from the user device via the network or from the doorbell device itself, for example, when the local user interface receives the user input.

Figure 2:
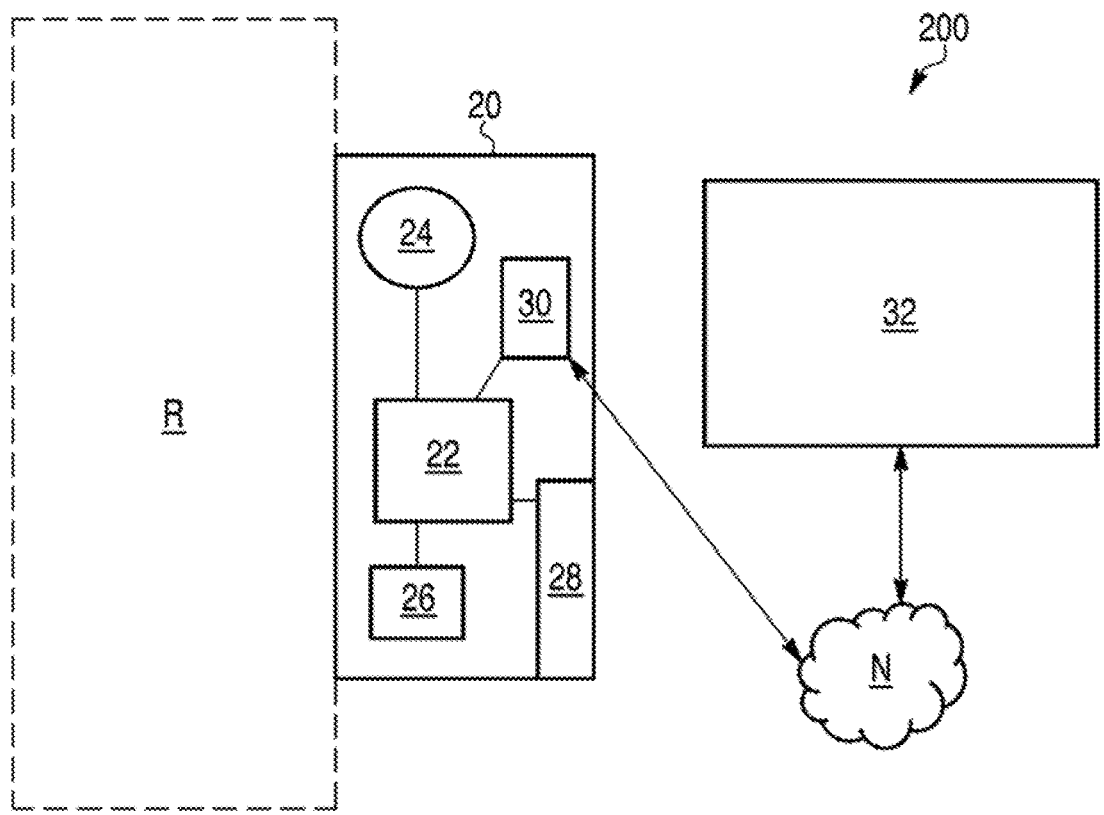
FIG. 2 is a block diagram of a system in accordance with disclosed embodiments.

FIG. 1 is a block diagram of a doorbell device 20 in accordance with disclosed embodiments, and FIG. 2 is a block diagram of a system 200 in accordance with disclosed embodiments. As seen in FIG. 1, in some embodiments, the doorbell device 20 can include a processor 22, a camera 24, a local memory 26, a local user interface 28, and a transceiver 30. As seen in FIG. 2, in some embodiments, the system 200 can include the doorbell device 20 and a cloud server 32 such that the doorbell device 20 can be located outside of a region R and such that the transceiver 30 can communicate with the cloud server 32 via a network N.

Figure 3:
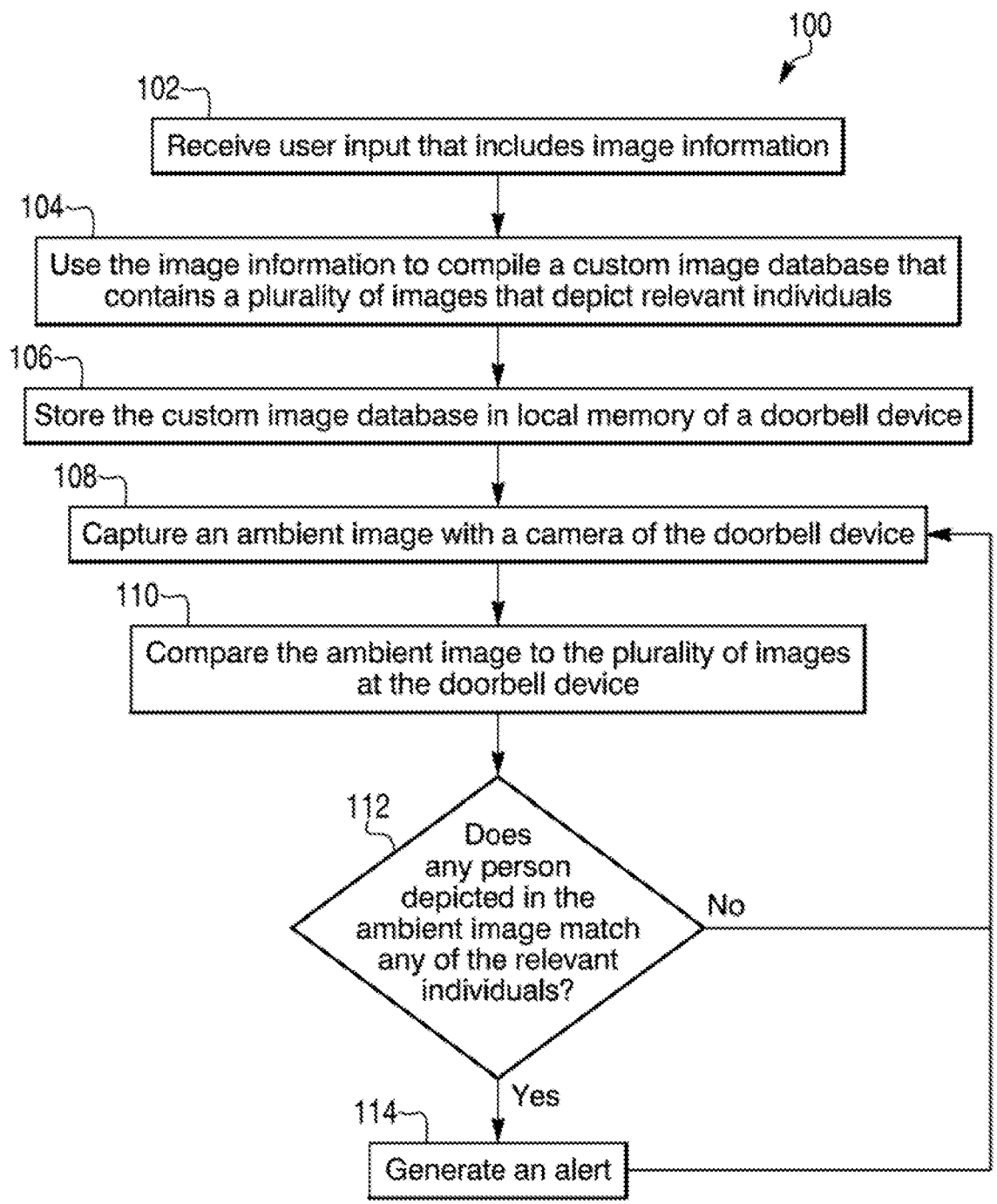
FIG. 3 is a flow diagram of a method in accordance with disclosed embodiments.

FIG. 3 is a flow diagram of a method 100 in accordance with disclosed embodiments. As seen in FIG. 3, the method 100 can include the doorbell device 20 or the cloud server 32 receiving user input that includes image information, as in 102, and the doorbell device 20 or the cloud server 32 using the image information to compile a custom image database that contains a plurality of images that depict relevant individuals, as in 104. Then, the method 100 can include the doorbell device 20 storing the custom image database in the local memory 26, as in 106.

After storing the custom image database in the local memory 26, the method 100 can include the doorbell device 20 capturing an ambient image with the camera 24, as in 108. Then, the method 100 can include the doorbell device 20 comparing the ambient image to the plurality of images stored in the custom image database in the local memory 26, as in 110, and using results of such a comparison to determine whether any person depicted in the ambient image matches any of the relevant individuals, as in 112. When all people depicted in the ambient image fail to match any of the relevant individuals, the method 100 can continue capturing ambient images, as in 108. However, when any person depicted in the ambient image matches any of the relevant individuals, the method 100 can include the doorbell device 20 generating an alert, as in 114, before continuing to capture ambient images, as in 108.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
receiving user input that includes image information, the image information including threat criteria, a geographic location, and a location range, wherein the threat criteria comprise a particular type of crime;
parsing the threat criteria of the image information to identify relevant non-private image databases to query;
retrieving a plurality of images from the relevant non-private image databases using the image information to compile a custom image database, wherein each of the plurality of images depicts a respective registered individual who is associated with (1) a respective criminal history that matches the threat criteria and (2) a respective residence that falls within the location range of the geographic location;
supplementing the custom image database with a plurality of grey-list images, each of which depicts a respective user-identified individual, and a user-provided indication of whether an individual depicted in each respective grey-list image is safe or unsafe, wherein the registered individuals include the respective user-identified individual depicted in each of the plurality of grey-list images that is associated with a user-provided indication of being unsafe;

storing the custom image database in local memory of a doorbell device;

capturing an ambient image with a camera of the doorbell device;

determining whether any person depicted in the ambient image matches any of the registered individuals by comparing the ambient image to the plurality of images at the doorbell device; and when any person depicted in the ambient image matches any of the registered individuals, generating an alert.

2. The method of claim 1 further comprising:
compiling the custom image database at the doorbell device.

3. The method of claim 1 further comprising:
compiling the custom image database by receiving the custom image database at the doorbell device from a cloud server that is remote from the doorbell device.

4. The method of claim 1 further comprising:
vector mapping the plurality of images with an artificial intelligence model to identify respective facial recognition characteristics of each of the registered individuals;

vector mapping the ambient image with the artificial intelligence model to identify personal facial characteristics of any person depicted in the ambient image; and determining that any person depicted in the ambient image matches any of the registered individuals when the personal facial recognition characteristics of any person depicted in the ambient image match the respective facial recognition characteristics of any of the registered individuals.

5. The method of claim 4, wherein the personal facial recognition characteristics comprise one or more of eye color, hair color, face size, face shape, height, and weight.

6. The method of claim 4, wherein a maximum quantity for the registered individuals in the custom image database is proportional to a processing power of the doorbell device.

7. The method of claim 1 further comprising:
receiving the user input from a user device via a network.

8. The method of claim 1 further comprising:
receiving the user input from a user interface of the doorbell device.

9. The doorbell device of claim 8, wherein the processor compiles the custom image database at the doorbell device.

10. The doorbell device of claim 8, wherein the processor compiles the custom image database by receiving the custom image database at the doorbell device from a cloud server that is remote from the doorbell device.

11. A doorbell device comprising:
a processor;
a local memory; and
a camera that captures an ambient image;

wherein the processor receives user input that includes image information, the image information including threat criteria, a geographic location, and a location range, wherein the threat criteria comprise a particular type of crime, wherein the processor parses the threat criteria of the image information to identify relevant non-private image databases to query, wherein the processor received a plurality of images from the relevant non-private image databases using the image information to compile a custom image database, wherein each of the plurality of images depicts a respective registered individual who is associated with (1) a respective criminal history that matches the threat criteria and (2) a respective residence that falls within the location range of the geographic location, wherein the processor supplements the custom image database with a plurality of grey-list images, each of which depicts a respective user-identified individual, and a user-provided indication of whether an individual depicted in each respective grey-list image is safe or unsafe, wherein the registered individuals include the respective user-identified individual depicted in each of the plurality of grey-list images that is associated with a user-provided indication of being unsafe;

wherein the custom image database contains a plurality of images that depict relevant individuals, wherein the processor determines whether any person depicted in the ambient image matches any of the registered individuals by comparing the ambient image to the plurality of images, and wherein, when any person depicted in the ambient image matches any of the registered individuals, the processor generates an alert.

12. The doorbell device of claim 11 wherein the processor vector maps the plurality of images with an artificial intelligence model to identify respective facial recognition characteristics of each of the registered individuals, wherein the processor vector maps the ambient image with the artificial intelligence model to identify personal facial characteristics of any person depicted in the ambient image, and wherein the processor determines that any person depicted in the ambient image matches any of the registered individuals when the personal facial recognition characteristics of any person depicted in the ambient image match the respective facial recognition characteristics of any of the registered individuals.

13. The doorbell device of claim 11 further comprising:
a transceiver that receives the user input from a user device via a network.

14. The doorbell device of claim 11 further comprising:
a local user interface that receives the user input.

15. A system comprising:
a cloud server;
a doorbell device that is remote from the cloud server;
a local memory of the doorbell device; and
a camera of the doorbell device, wherein the cloud server receives user input that includes image information, the image information including threat criteria, a geographic location, and a location range, wherein the threat criteria comprise a particular type of crime, wherein the cloud server parses the threat criteria of the image information to identify relevant non-private image databases to query, wherein the cloud server retrieves a plurality of images from the relevant non-private image databases using the image information to compile a custom image database and transmits the custom image database to the doorbell device for storage in the local memory, wherein each of the plurality of images depicts a respective registered individual who is associated with (1) a respective criminal history that matches the threat criteria and (2) a respective residence that falls within the location range of the geographic location, wherein the doorbell device supplements the custom image database with a plurality of grey-list images, each of which depicts a respective user-identified individual, and a user-provided indication of whether an individual depicted in each respective grey-list image is safe or unsafe, wherein the registered individuals include the respective user-identified individual depicted in each of the plurality of grey-list images that is associated with a user-provided indication of being unsafe;

wherein, after the local memory stores the custom image database therein, the camera captures an ambient image, wherein the doorbell device determines whether any person depicted in the ambient image matches any of the registered individuals by comparing the ambient image to the plurality of images, and wherein, when any person depicted in the ambient image matches any of the registered individuals, the doorbell device generates an alert.

16. The system of claim 15 wherein the cloud server vector maps the plurality of images with an artificial intelligence model to identify respective facial recognition characteristics of each of the registered individuals, wherein the doorbell device vector maps the ambient image with the artificial intelligence model to identify personal facial characteristics of any person contained within the ambient image, and wherein the doorbell device determines that any person depicted in the ambient image matches any of the registered individuals when the personal facial recognition characteristics of any person depicted in the ambient image match the respective facial recognition characteristics of any of the registered individuals.

17. The system of claim 15 wherein the cloud server receives the user input from a user device via a network.

18. The system of claim 15 wherein the cloud server receives the user input from the doorbell device.

19. The system of claim 15, wherein the doorbell device compiles the custom image database.

20. The system of claim 15, wherein the doorbell device compiles the custom image database by receiving the custom image database at the doorbell device from the cloud server that is remote from the doorbell device.

* * * * *